Dec. 30, 1930.  R. D. SARVER  1,786,457
WINDSHIELD WIPER ELEMENT AND CONSTRUCTION
Filed Oct. 28, 1927
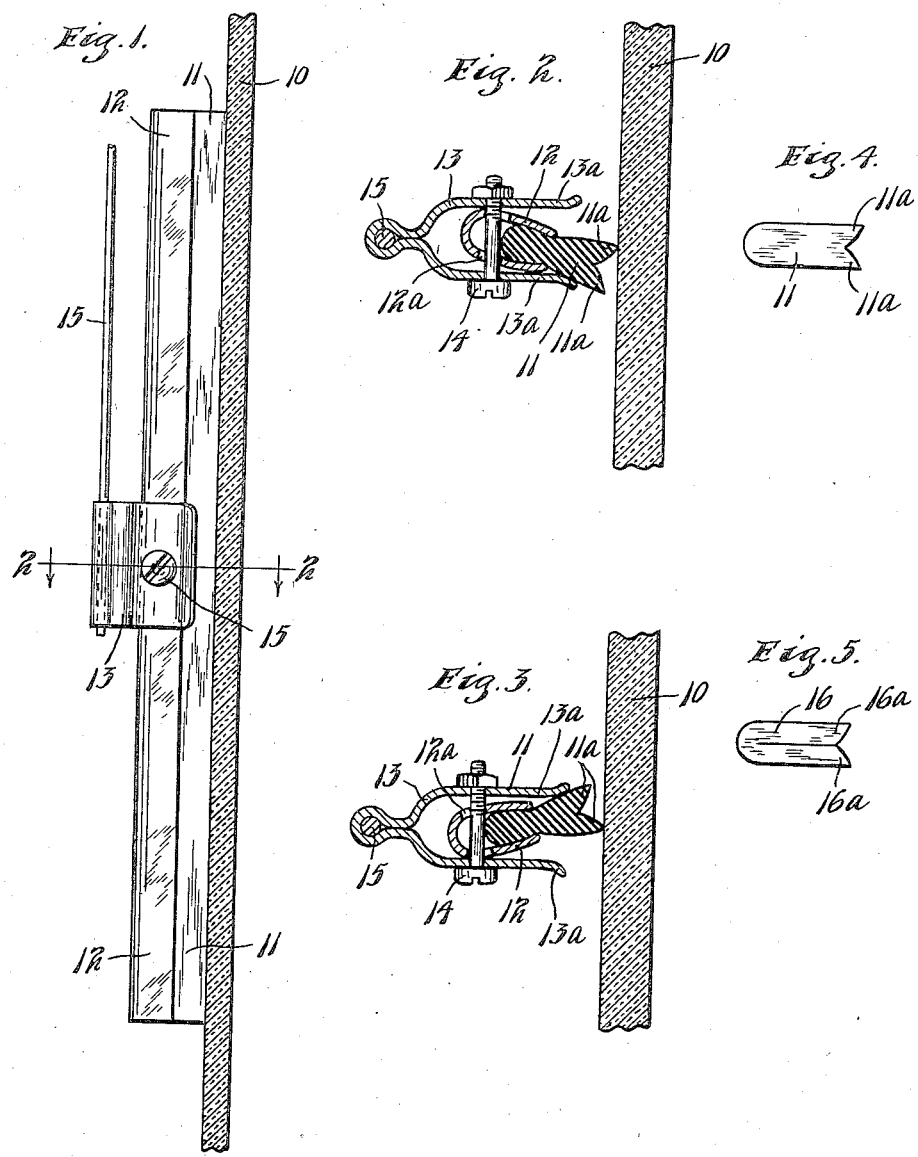
INVENTOR.
R. D. SARVER.
BY HIS ATTORNEYS.

Patented Dec. 30, 1930

1,786,457

UNITED STATES PATENT OFFICE

RAY D. SARVER, OF MINNEAPOLIS, MINNESOTA

WINDSHIELD-WIPER ELEMENT AND CONSTRUCTION

Application filed October 28, 1927. Serial No. 229,336.

This invention relates to a wiper for a smooth surface, and while the invention is capable of many applications, it particularly is designed for use as a windshield wiper such as used on the windshield of a modern automobile. Such windshield wipers as heretofore used, commonly comprise a strip of rubber which is held against the surface of the windshield and moved across the same in opposite directions. This wiping action often does not clean the glass of the moisture or dirt, but the wiper merely moves over the surface of the windshield, allowing the water and dirt to pass thereunder, so that the water and other matter is smeared back and forth across the windshield.

It is an object of this invention, therefore, to provide a windshield wiper having means comprising a sharp angle or edge firmly engaging the surface of the windshield so that all moisture and dirt will be cleaned from the shield with each movement of the wiper.

Another object of the invention is to provide a double-edged blade for windshield wipers, the edges being so positioned that they will alternately contact with the glass as the wiper travels back and forth across the windshield and will likewise present a stiff, sharp cleaning edge to the glass.

It is a further object of the invention to provide a windshield wiper comprising a strip of resilient or rubberlike material having a pair of edges extending longitudinally thereof, which are of blunt angle-shape in cross section.

It is another object of the invention to provide such a wiper as set forth in the preceding paragraph, together with means for moving it across the windshield and for engaging the rear side thereof in its movement to cause a close engagement with the windshield.

These and other objects and advantages of the invention will be fully set forth in the following description made in connection with the accompanying drawings, in which like reference characters refer to similar parts throughout the several views and in which:—

Fig. 1 is a view in side elevation of the wiper showing a portion of the windshield in vertical section;

Fig. 2 is a section taken on line 2—2 of Fig. 1;

Fig. 3 is a view similar to Fig. 2, showing the wiper in a different position;

Fig. 4 is an end view of the resilient piece forming the portion of the wiper; and Fig. 5 is an end view of a modified form of the device shown in Fig. 4.

Referring to the drawings, a portion of a transparent windshield now commonly used on an automobile is illustrated, as 10. The wiper movable in engagement with said windshield comprises a strip of resilient material 11, which in the present invention is held in a holder 12, preferably of metal. The member 11 as shown in Figs. 2 and 3 has a V-shaped notch or recess in its outer edge forming on said member a pair of V-shaped edges or edge portions 11a. The angle at the terminals of said portions is rather blunt so that a good stiff sharp edge is produced. The holder 12 has its edges bent slightly or crimped inwardly to firmly hold the member 11 intermediate its edges. The member 12 has a transverse aperture 12a extending therethrough adjacent its central portion and said member is at its central portion disposed in a holder 13. The holder 13 is preferably formed from sheet metal and has parallel side portions 13a between which member 12 extends. A headed and nutted bolt 14 extends through and is secured in member 13, which bolt extends loosely through the aperture 12a in member 12. The member 13 is secured at its outer end to an operating rod 15 which will be connected to the actuating means for the wiper. While the member 13 may be variously formed, in the embodiment of the invention illustrated it is shown as formed of one piece of sheet metal folded at its central portion to form a circular lug, receiving rod 15 and clamped thereto, the side portions of said member being in contact adjacent said member and then diverging to form the side portions 13a. The member 11 may be made of one piece of material as shown in Fig. 4, having the V-shaped notch in its edge or it may be made from a sheet of material having its edge beveled as shown in member 16 in Fig. 5, said member then being folded along the central line so as to bring the beveled edges into adjacent position, thus forming two V-shaped sharp edges on the member 16.

In operation the wiper will be moved back and forth across the windshield by an oscillating action of rod 15. As it moves in the direction of the arrow indicated in Fig. 2, the members 12 and the member 11 carried thereby will rock, as shown in Fig. 2, member 12 engaging the inside of one portion 13a and the member 11 being engaged at the opposite side by the edge of the other member 13a. The advance side of member 11 is thus brought into position substantially perpendicular to the surface of the windshield 10 and member 11 is moved along said surface with the sharp edge engaging the same. Any buckling of the member 11 is prevented by engagement of the rear side thereof by the edge of the member 13a. The wide angle of the edge 11a, the engagement of the member 11 with the side 13a, and the engagement of the holder 12 with the member 13, all coact to prevent any chattering or vibration of the member 11 so that the same is moved firmly along the surface of the windshield and removes any water or dirt therefrom. When the reverse movement of the wiper takes place, the same will swing to the position shown in Fig. 3. In this movement the edge which has been in engagement with the windshield swings free therefrom and the other edge comes into the same relation to the windshield. The water and materials moved by the first edge will therefore be dumped or left at the limit of movement on the windshield and this material will not be dragged back with the wiper. With the reverse movement the same firm engagement of the sharp edge against the windshield will occur so that a perfect wiping movement will be had. The material moved by the latter edge will also be left at the limit of movement when the wiper oscillates for its return movement.

From the above description it is seen that applicant has provided a very simple and efficient structure of windshield wiper and one which will avoid the smearing of water and dirt on the glass and the vibrating or chattering effect which often leaves parallel ridges or streaks on the glass. The sharp edges are alternately pressed against the glass so that all water, sand, etc., is moved ahead of the wiper and not dragged under the same. Where a flat surface is dragged over the glass, much of the water and dirt as stated is merely dragged and smeared over the glass. This objectionable action is eliminated in applicant's device. The device is quite simple in construction and can be easily and inexpensively made. The same has been demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. In a windshield wiper, a strip of yieldable material having an obtuse-angled V-shaped groove in one of its longitudinal edges, said groove intersecting the sides of the strip to form a pair of sharp edge portions, and means for moving the strip over a windshield with said edge portions alternately engaging the surface thereof.

2. A windshield wiper comprising a strip of yieldable material having a groove in one of its longitudinal edges, said groove intersecting the sides of the strip to form a pair of spaced sharp edge portions, said edge portions being comparatively stiff and adapted for use independently against a windshield, an operating member operable back and forth in a plane parallel to that of the windshield surface, a carrier for the wiper strip, and means to rockably support said carrier on the operating member so as to rock the wiper strip in opposite directions at the opposite ends of the stroke, whereby only one of said edge portions of the strip will contact with the windshield at a time.

In testimony whereof I affix my signature.

RAY D. SARVER.